C. G. SMITH.
MAGNETIC SPEEDOMETER.
APPLICATION FILED AUG. 8, 1918.
1,312,081.
Patented Aug. 5, 1919.
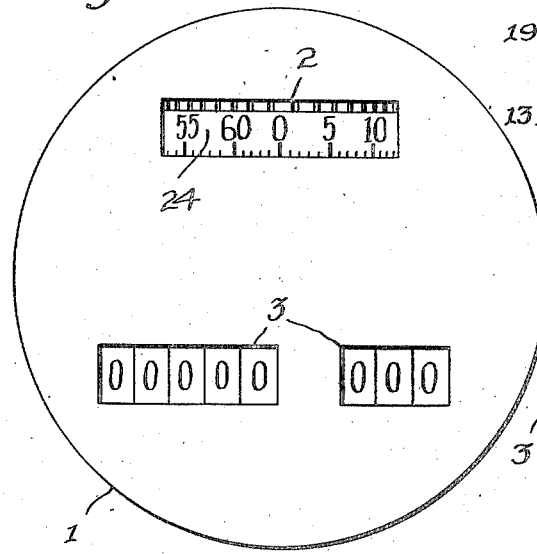
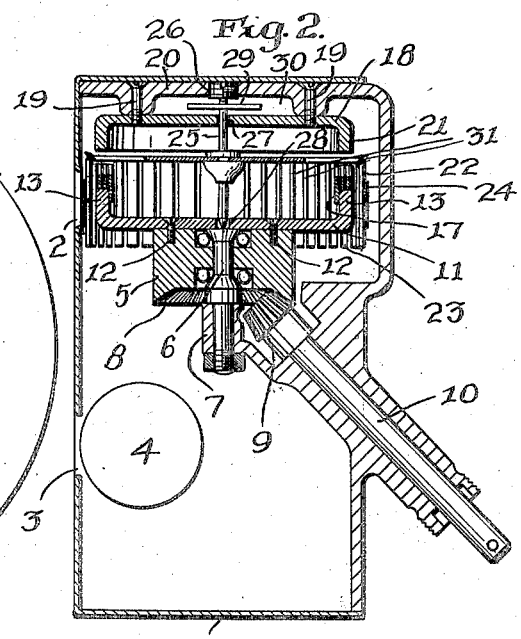
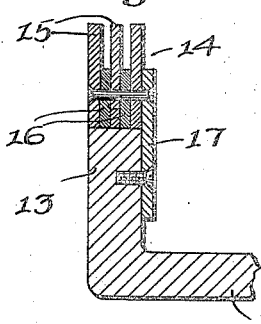
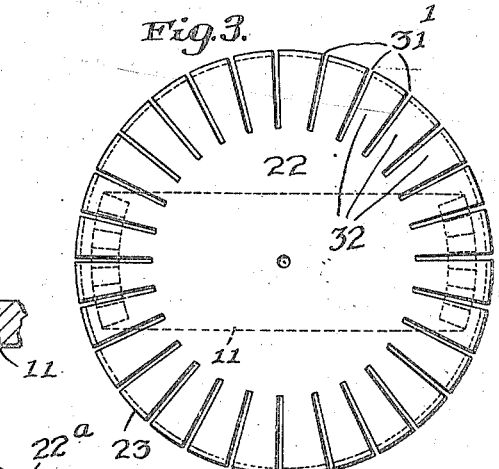
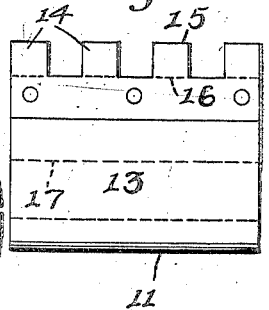
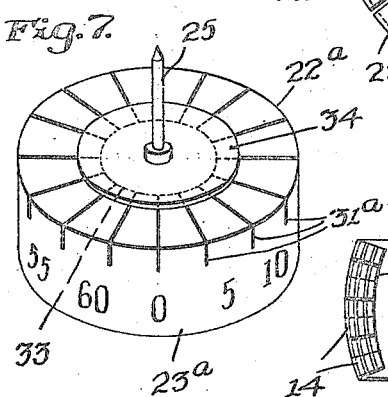
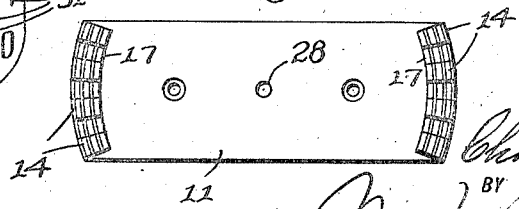

UNITED STATES PATENT OFFICE.

CHARLES G. SMITH, OF WASHINGTON, DISTRICT OF COLUMBIA, ASSIGNOR TO CHARLES FISCHER, OF BROOKLYN, NEW YORK.

MAGNETIC SPEEDOMETER.

1,312,081.   Specification of Letters Patent.   Patented Aug. 5, 1919.

Application filed August 8, 1918.  Serial No. 248,983.

*To all whom it may concern:*

Be it known that I, CHARLES G. SMITH, a citizen of the United States, and a resident of Washington, District of Columbia, have invented certain new and useful Improvements in Magnetic Speedometers, of which the following is a specification.

The invention is an improvement in magnetic speedometers, and an object is to provide a speedometer having a rotating magnet having a traveling field, the reaction of which upon a conducting disk or cup may be very largely independent of variations in the strength of the magnet. One of the advantages of the use of such a magnet, over either a stationary magnet or a rotating magnet having concentric poles, is that it does not disturb near-by apparatus, such as a compass, which would be found on aeroplanes. A further object is to provide a specific construction of advantageous design.

In a previous Patent 1,207,647 of December 5, 1916, I disclosed, in connection with an illustrative embodiment having a stationary magnet and a rotating armature, a principle of construction and operation for magnetic speedometers in accordance with which a series of concentrating teeth upon one of the members of the magnetic circuit is magnetized at or above the saturation point, so that the intensity of magnetization of the material of the teeth remain at a constant maximum irrespective of variations in the strength of the general magnetic field within any range above the value which is sufficient to produce the said saturation. The importance of this arises from the fact that the torque upon the oscillatory conductor which is connected with the indicator is due not to the absolute number of lines of force passing through it, but instead to the relatively greater concentration at certain moving regions over others; consequently the amount of torque will remain the same irrespective of absolute values as long as the difference between concentrations at the teeth and between the teeth remains unchanged, and this will be true if the teeth are saturated, for the reasons set forth in my prior patent.

A practical advantage of a speedometer designed in accordance with my said patent is that variations in the field at different times, due, for example, to changes in temperature, will not change the torque, and therefore will not affect the indication of the instrument. With a traveling field, however, the torque would not remain constant, even though the teeth were saturated, because the general field would be translated or displaced relatively to the conductor, and this would create eddy currents which would vary according to variations in the field; consequently while the eddy currents due to the teeth would be of constant value, the total torque, being the sum of the effects of both sets of eddy currents, would not be constant if the general field varied. A purpose of the invention, therefore, is to suppress those eddy currents in the conductor which would result from the movement of the general field while permitting the flow of eddy currents produced by concentrating teeth, which are preferably magnetized at saturation.

In the accompanying drawings illustrating an embodiment of the invention:

Figure 1 is a face view of the instrument;

Fig. 2 is a central vertical section;

Fig. 3 is a plan view looking down on the oscillatory conductor;

Fig. 4 is a plan view of the magnet;

Fig. 5 is an enlarged end view of the magnet;

Fig. 6 is a fragmentary enlarged section through the toothed part of the magnet; and Fig. 7 is a perspective view of an alternative form of the conductor element.

The instrument may be contained in an upright circular case 1 having an upper window 2 through which the speedometer indication is visible, and lower windows 3 behind which odometer indicators 4 may be located. A hub 5 is mounted rotatably upon the upwardly projecting portion of a fixed axle 6 rising from a frame portion 7 within the casing. The bottom of this hub has internal beveled gear teeth 8 meshed by a beveled driving pinion 9 on an inclined shaft 10, which passes through the rear wall of the casing. The rotating magnet 11 is secured to the top of the hub by means of screws 12. While the foregoing mode of mounting and driving the magnet is preferred, it will be understood that other constructions may be employed.

The axis of rotation of the magnet does not pass through the centers of the polar faces or poles, but instead the poles are located off center, that is, each pole is located with its center outside of the axis of rotation and in the illustrated construction the poles are preferably at opposite sides of the axis. In the construction illustrated the magnet consists of a horizontal bar having upturned ends or poles 13, that is to say, ends projecting substantially parallel with the axis of rotation, which carry series of concentrating teeth 14, of such material and design as to be readily saturated. Preferably the teeth are of soft iron and are laminated, the laminations extending in the circumferential direction. This may be accomplished by providing a number of soft iron strips 15 cut to the shape of the teeth and a number of low spacer strips 16 of the same material, which are assembled side by side to form a toothed extension which rests upon and conforms to the upturned end of the magnet. The strips may all be secured by riveting or otherwise to an inner supporting plate 17, which is secured to the body of the magnet 3. The teeth are preferably of substantially rectangular elevation, that is to say of the same height as circumferential width. The lamination of the teeth both reduces the amount of material therein and affords readier ingress and egress for the lines of force, since the latter have access to the sides as well as to the edges of the toothed strips.

As illustrated in my copending application, Serial No. 248,984, filed Aug. 8, 1918, covering another specific embodiment of the present generic invention, the armature may be mechanically coupled with the magnet to rotate therewith. In the present instance, however, I prefer to employ a stationary armature 18, which is most advantageously in the form of a soft iron disk or cup attached by screws 19 beneath the top of the frame 20 and having a depending circular flange 21 disposed vertically above the upturned tooth-bearing ends of the magnet.

The oscillatory conductor, in which eddy currents are set up, comprises a copper or other conducting disk or cup 22, the disk being interposed horizontally between the magnet and armature. Because of the advantageous nature of the magnetic circuit and the high torque obtained in this way, the conductor may be made of brass or other alloy, which while of higher resistance is of relatively low temperature coefficient. A depending flange 23 on the conductor surrounding the magnet serves as a carrier for a non-conducting strip 24, which bears the indicator numbers. The conductor is shown supported by a vertical staff 25 passing through and clamped to the center of the disk and having point bearings at its ends in the top of the axle 6 and in a screw plug 26 in the top of the frame. In order to reach these bearings the staff 25 passes freely through openings 27 and 28 formed in the armature and magnet, respectively. The customary spring 29, which resists the drag of the magnet upon the conductor disk, is located in a chamber 30, which is provided between the top of the frame 20 and the armature.

In the form shown in Figs. 2 and 3, the conductor disk is provided with radial slots 31 extending inward from the periphery a suitable distance beyond the opposed teeth and flanges of the magnet and armature. In this form the slots also extend the full length of the flange 23, so that the slots are electrically open at the lower edge of the cup. The regions or bars 32 of the conductor disk between the slots should be as narrow as possible, but wide enough for effective generation of eddy currents within each area as it is crossed by a tooth 14. As shown the said regions are substantially wider than the slots, the latter being only wide enough for insulation purposes. The width of the regions 32 in relation to the teeth 14 of the magnet is such that the teeth in their rotation will set up eddy currents within the said regions, the regions being wider than the teeth, and the preferred relation being one in which the circumferential width of the regions is about twice that of the teeth.

Fig. 7 illustrates an alternative form $22^a$ of the conductor, in which the slots $31^a$ extend only part way or not at all into the flange $23^a$, which flange may accordingly have the indicator characters placed directly thereon. In this form the conductor disk has a large central opening 33, and the slots are carried radially inward to the edge of this opening. Support for the conductor is afforded by clamping the staff 25 to a pair of insulator disks 34, which firmly embrace the central part of the conductor disk, above and below.

In operation, the eddy currents set up in the conductor are not dependent upon the strength of the permanent magnet, and neither is the torque, so long as the magnet is stronger than a value sufficient to saturate the teeth 14. This is true if the slots in the conductor are open and if the magnetizing field is substantially uniform over a region as large or larger than a region 32. Furthermore, it is important that the teeth be narrower than the regions 32. It will be understood, therefore, that eddy currents are produced within each region 32 as a tooth passes it, but the general field does not produce eddy currents, because the slots 31 prevent circulation across them, and these particular currents must pass across or around the slots or not exist. The general magnetic field is composed of all the lines of force emanating from and entering the north and south poles of the magnet, and since these are much wider than the regions 32, the only effect of the travel of the poles as a whole past the regions is to create a difference of potential between the inner and outer portions of the regions, and as the latter are not connected in closed circuit with each other a resulting current can not pass. Hence the chief currents generated in the conductor are due to the excess magnetism of the teeth 14 over and above the general magnetism. This excess magnetism I shall call $4\pi I$, following the usual notation; the general magnetism I shall call H after the customary notation. If now the field H is more than strong enough to saturate the teeth, then I, the intensity of magnetization of the teeth, remains a constant maximum value. Any increase or decrease of H, due to any change in the strength of the magnet, does not affect I so long as such changes lie in a range above that value of H which saturates the teeth. Consequently the torque is uniform. In other words, the invention makes it possible, with a traveling field, to realize or approximate the advantages of the principle of constant intensity of magnetization set forth in my prior patent.

What I claim as new is:

1. In a magnetic speedometer, the combination of a rotating magnet having pole faces whose centers are located outside of the axis of rotation of the magnet, thereby producing a traveling field, an armature, one of said members having a series of concentrating teeth which are magnetized at or above saturation, and an oscillatory conductor slotted to obstruct the flow of eddy currents due to the general field, while permitting eddy currents to be set up by the teeth within the regions between the slots.

2. In a magnetic speedometer, the combination of a rotating magnet having pole faces whose centers are located outside of the axis of rotation of the magnet, thereby producing a traveling field, an armature, one of said members having a series of concentrating teeth, and an oscillatory conductor slotted transversely to the circumferential direction, the width of the teeth being less than that of the regions of the conductor between the slots.

3. In a magnetic speedometer, the combination of a rotating magnet having pole faces whose centers are located outside of the axis of rotation of the magnet, thereby producing a traveling field, an armature, one of said members having a series of concentrating teeth, and an oscillatory conductor having slots extending transversely to the circumferential direction and open at one edge of the conductor, the regions of the conductor between the slots being wider than the slots, whereby generation of eddy currents is substantially restricted to those which will flow within the regions between the slots.

4. In a magnetic speedometer, the combination of a rotating magnet having pole faces whose centers are located outside of the axis of rotation of the magnet, thereby producing a traveling field, a stationary armature, one of the foregoing members being provided with a series of concentrating teeth, and an oscillatory conductor slotted transversely to the circumferential direction, the slots being open and the regions between the slots being of greater width than the teeth.

5. In a magnetic speedometer, the combination of a rotating magnet, an armature, laminated concentrating teeth on one of said members, and an oscillatory conductor slotted transversely to the circumferential direction with open slots and having the spaces between the slots wider than the teeth.

6. In a magnetic speedometer, the combination of a rotating bar magnet having its ends projecting in a direction substantially parallel with the axis and provided with concentrating teeth, a stationary armature having a circular flange opposed to the toothed ends of the magnet, and an interposed oscillatory slotted conductor provided with a flange encircling one of the other members.

7. In a magnetic speedometer, the combination of a rotating bar magnet having its poles at opposite sides of the axis of rotation and projecting in a direction substantially parallel with the axis, an armature having a circular flange opposed to the bent ends of the magnet, one of said members being provided with a series of concentrating teeth, an interposed conductor disk slotted with open slots, a staff for the conductor disk passing freely through the armature, and a spring for said conductor connected with the staff at the opposite side of the armature from the disk.

8. In a magnetic speedometer, the combination of a rotating bar magnet having its poles at opposite sides of the axis of rotation and provided with laminated concentrating teeth, a stationary circular armature opposite the teeth of the magnet, and an interposed oscillatory conductor slotted with open slots.

In testimony whereof, I have signed my name to this specification.

CHARLES G. SMITH.